United States Patent
Zhou et al.

(10) Patent No.: US 7,620,205 B2
(45) Date of Patent: Nov. 17, 2009

(54) METHOD FOR CHARACTERIZING SHAPE, APPEARANCE AND MOTION OF AN OBJECT THAT IS BEING TRACKED

(75) Inventors: Shaohua Kevin Zhou, Plainsboro, NJ (US); Jie Shao, Gaisthersburg, MD (US); Dorin Comaniciu, Princeton Junction, NJ (US); Bogdan Georgescu, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 675 days.

(21) Appl. No.: 11/466,477

(22) Filed: Aug. 23, 2006

(65) Prior Publication Data

US 2007/0098239 A1 May 3, 2007

Related U.S. Application Data

(60) Provisional application No. 60/712,979, filed on Aug. 31, 2005.

(51) Int. Cl.
  *G06K 9/00* (2006.01)
  *A61B 6/00* (2006.01)
(52) U.S. Cl. .......................... 382/103; 382/203; 378/20
(58) Field of Classification Search ................ 382/100, 382/107, 128, 129, 130, 131, 132, 133, 134, 382/155, 168, 174, 181, 191, 197, 199, 201, 382/203, 214, 232, 243, 256, 274, 276, 286, 382/287, 291, 103; 29/898.13; 607/126; 427/2.25; 378/20
See application file for complete search history.

(56) References Cited

U.S. PATENT DOCUMENTS

| | | | | |
|---|---|---|---|---|
| 5,578,069 | A * | 11/1996 | Miner, II | 607/126 |
| 6,289,135 | B1 * | 9/2001 | Declerck et al. | 382/276 |
| 7,072,494 | B2 * | 7/2006 | Georgescu et al. | 382/103 |
| 7,251,893 | B2 * | 8/2007 | Cohen et al. | 29/898.13 |
| 7,323,210 | B2 * | 1/2008 | Castro et al. | 427/2.25 |
| 7,558,402 | B2 * | 7/2009 | Zhou et al. | 382/103 |

* cited by examiner

*Primary Examiner*—Seyed Azarian

(57) ABSTRACT

A method for generating Pairwise Active Appearance Models (PAAMs) that characterize shape, appearance and motion of an object and using the PAAM to track the motion of an object is disclosed. A plurality of video streams is received. Each video stream includes a series of image frames that depict an object in motion. Each video stream includes an index of identified motion phases that are associated with a motion cycle of the object. For each video stream, a shape of the object is represented by a shape vector. An appearance of an object is represented by an appearance vector. The shape and appearance vectors associated at two consecutive motion phases are concatenated. Paired data for the concatenated shape and appearance vectors is computed. Paired data is computed for each two consecutive motion phases in the motion cycle. A shape subspace is constructed based on the computed paired data. An appearance subspace is constructed based on the computed paired data. A joint subspace is constructed using a combination of the shape subspace and appearance subspace. A PAAM is generated using the joint subspace and the PAAM is stored in a database.

18 Claims, 4 Drawing Sheets

METHOD FOR CHARACTERIZING SHAPE, APPEARANCE AND MOTION OF AN OBJECT THAT IS BEING TRACKED

CROSS REFERENCE TO RELATED APPLICATIONS

This application claims the benefit of U.S. Provisional Patent Application Ser. No. 60/712,979, filed on Aug. 31, 2005, which is incorporated by reference in its entirety.

FIELD OF THE INVENTION

The present invention is directed to a method for characterizing shape, appearance and motion of an object that is being tracked, and more particularly, to a system and method for characterizing shape, appearance and motion of a target that undergoes a series of motion phases.

BACKGROUND OF THE INVENTION

Characterizing shape, appearance and motion is an important issue in medical imaging applications. One approach to accomplish this characterization is the use of active models. Active shape models (ASMs) depict shape statistics using principal component analysis. Active appearance models (AAMs) extend the ASM to model the appearance so that both shape and appearance are jointly modeled using principal component analysis. The ASM and AAM are applicable to individual images only.

To deal with a video, active appearance motion models (AAMM) extend the AAM to characterize the motion in the video and is used for segmenting a spatiotemporal object. One restriction of the AAMM is that no global motion is allowed before neighboring frames; hence the AAMM is not applicable to online tracking.

For most visual tracking applications, measurement data are uncertain and sometimes missing: images are taken with noise and distortion, while occlusions can render part of the object-of-interest unobservable. Uncertainty can be globally uniform; but in most real-world scenarios, it is heteroscedastic in nature, i.e., both anisotropic and inhomogeneous. A good example is the echocardiogram (ultrasound heart data). Ultrasound is prone to reflection artifacts, e.g., specular reflectors, such as those that come from membranes. Because of the single "view direction", the perpendicular surface of a specular structure produces strong echoes, but tilted or "off-axis" surfaces may produce weak echoes, or no echoes at all (acoustic "drop out"). For an echocardiogram, the drop-out can occur at the area of the heart where the tissue surface is parallel to the ultrasound beam. In addition, left ventricle appearance changes are caused by fast movement of the heart muscle, respiratory inferences, unnecessary transducer movement, etc.

Due to its availability, relative low cost, and noninvasiveness, cardiac ultrasound images are widely used for assessing cardiac functions. In particular, the analysis of ventricle motion is an efficient way to evaluate the degree of ischemia and infarction. Segmentation or detection of the endocardium wall is the first step towards quantification of elasticity and contractility of the left ventricle. There is a need for a method for improved shape tracking of an object, such as a left ventricle.

SUMMARY OF THE INVENTION

The present invention is directed to a method for generating Pairwise Active Appearance Models (PAAMs) that characterize shape, appearance and motion of an object. A plurality of video streams is received. Each video stream comprises a series of image frames that depict an object in motion. Each video stream includes an index of identified motion phases that are associated with a motion cycle of the object. For each video stream, a shape of the object is represented by a shape vector. An appearance of an object is represented by an appearance vector. The shape and appearance vectors associated at two consecutive motion phases are concatenated. Paired data for the concatenated shape and appearance vectors is computed. Paired data is computed for each two consecutive motion phases in the motion cycle. A shape subspace is constructed based on the computed paired data. An appearance subspace is constructed based on the computed paired data. A joint subspace is constructed using a combination of the shape subspace and appearance subspace. A PAAM is generated using the joint subspace and the PAAM is stored in a database.

The present invention is also directed to a method for tracking an object in motion based on its shape and appearance at different motion phases. The object is represented by a plurality of landmark points. A video stream comprising a series of image frames that depict an object in motion is received. The shape of the object is identified in a first image frame and each landmark point associated with the shape of a contour of the object is initialized. An optical flow is computed for each landmark point of the shape. A corresponding motion phase index is determined for the first image frame. A determination is made as to whether the motion phase in the second image frame is the same as the motion phase in the first image frame and which corresponding PAAM to use. The PAAM is fused with the second image frame to predict the location of the landmark points associated with the object in the second image frame.

BRIEF DESCRIPTION OF THE DRAWINGS

Preferred embodiments of the present invention will be described below in more detail, wherein like reference numerals indicate like elements, with reference to the accompanying drawings.

DETAILED DESCRIPTION

The present invention is directed to a method for tracking deformable motion of an object. An example where such a method would be utilized is for tracking the local motion of a myocardial wall to detect regional wall motion abnormalities in the heart. The method may also be used to track the endocardial wall or epicardial wall of the heart. It is to be understood by those skilled in the art that the present invention may be used in other applications where motion tracking is useful such as, but not limited to, recognizing movement of human features such as head movements, facial features, hand movements or other body movements. The present invention can also be used in 2 dimensional, 3 dimensional and 4 dimensional (3D+time) medical analyses of anatomical structures such as the heart, lungs or tumors that are evolving over time.

Figure 1:
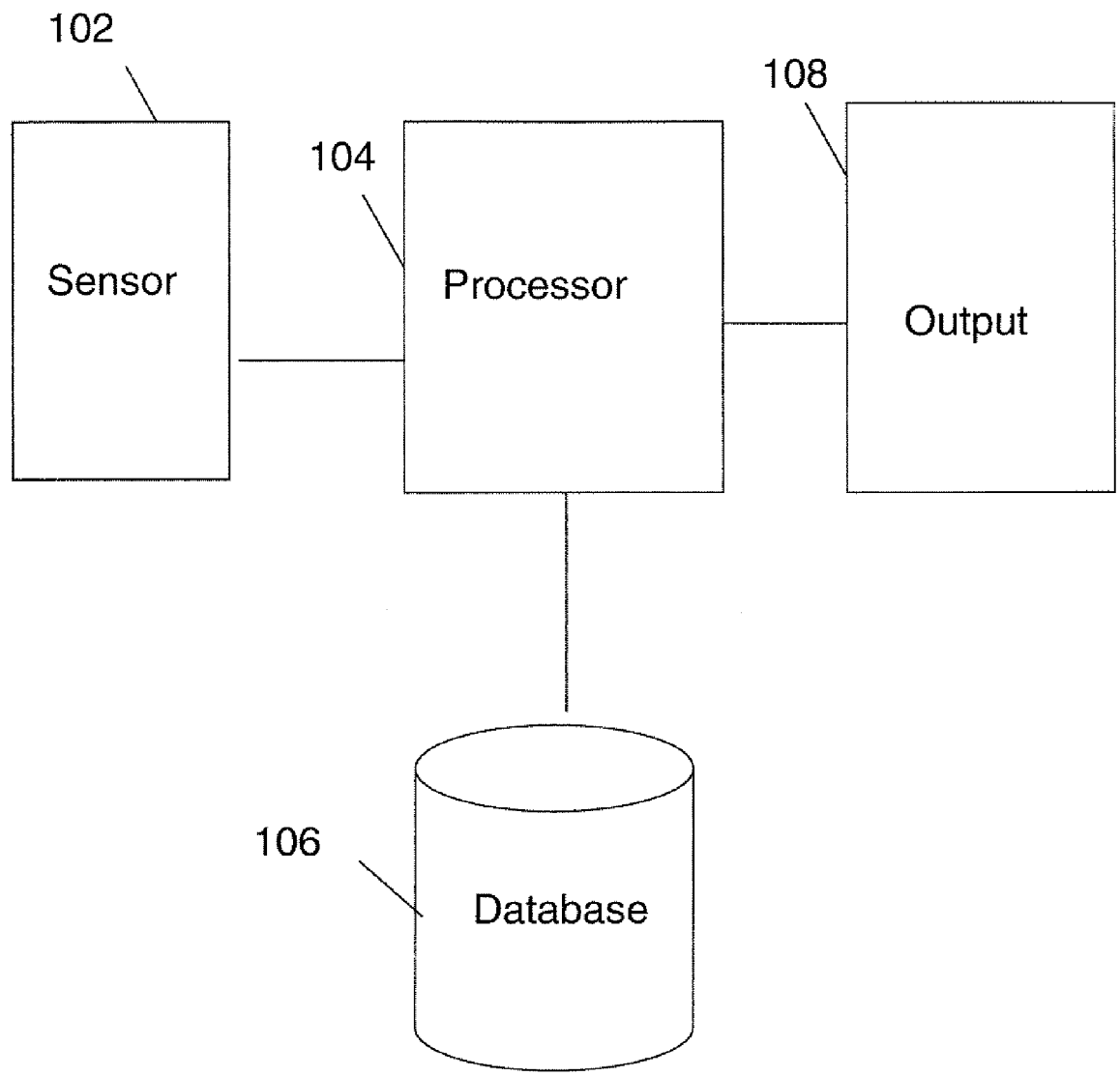
FIG. 1 is a system block diagram of a system for tracking the motion of an object in accordance with the present invention.

For purposes of describing the present invention, an example will be described for tracking the endocardial wall of the left ventricle by characterizing shape, appearance and motion of the contour of the wall. FIG. 1 illustrates an exemplary architecture of an echocardiograph system that uses a method for tracking the motion of an endocardial wall of a left ventricle in accordance with the present invention. A medical sensor 102, such as an ultrasound transducer is used to perform an examination on a patient. The sensor 102 is used to obtain medical measurements consistent with a particular medical examination. For example, a patient experiencing heart problems may have an echocardiogram performed to help diagnose the particular heart ailment. An ultrasound system provides two-, three-, and four (3D+time)-dimensional images of the heart from various perspectives.

The information obtained by the sensor 102 is communicated to a processor 104 which may be a workstation or personal computer. The processor 104 converts the sensor data into an image that is communicated to display 108. The display 108 may also communicate other graphical information or tables of information relating to the image. In accordance with the present invention, the processor 104 is also provided with data representing an initial contour of the endocardial wall. The data may be provided manually by a user such as a physician or sonographer, or automatically by the processor 104. The contour comprises a series of individual points, the movement of which is tracked by the processor 104 and illustrated on display 108. The specifics regarding how the individual points are tracked will be described in greater detail hereinafter.

In addition to data from the medical sensor 102, the processor 104 may also receive other data inputs. For example, the processor may receive data from a database 106 associated with the processor 104. The database provides annotated examples of how shape, appearance and dynamics of the target of interest evolve over time. The present invention uses a Pairwise Active Appearance Model (PAAM) to characterize statistical regularities in shape, appearance and motion.

Figure 2:
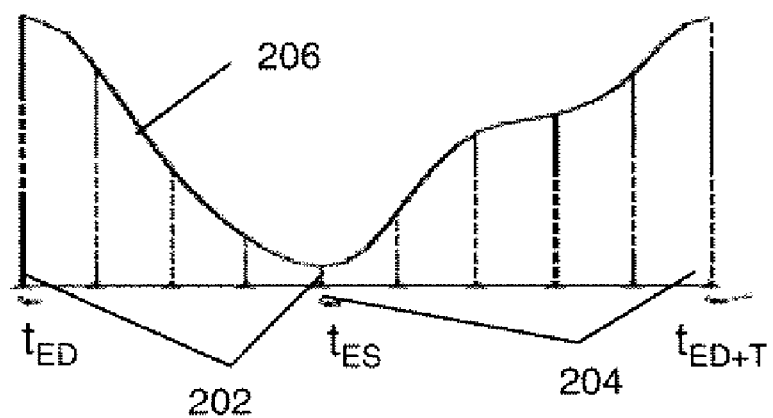
FIG. 2 illustrates a cardiac cycle that is divided into a number of motion phases in accordance with the present invention.

Assume that a target of interest undergoes a series of P motion phases indexed by p={1, 2, ..., P}. FIG. 2 illustrates an example of dividing a cardiac cycle into four equally spaced motion phases in systole 202 and five motion phases in diastole 204. In other words, for this cardiac cycle P=9. The curved line 206 represents the LV volume during each phase.

Figure 3:
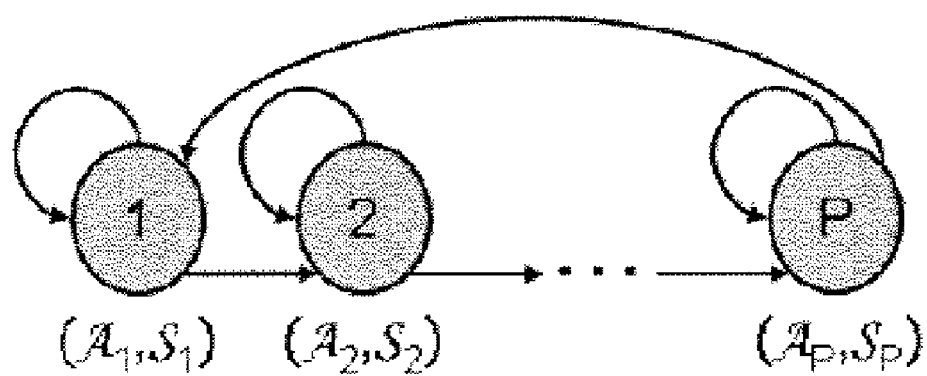
FIG. 3 illustrates the underlying principle of PAAM in accordance with the present invention.

FIG. 3 illustrates the underlying principle of PAAM. The PAAM depicts transitions in motion phases through a Markov chain. The PAAM either stays at the current motion phase or proceeds to the next one. For example, using the cardiac cycle of FIG. 2, given the end of diastole (ED) and the end of systole (ES) frames, it can easily be determined which motion phase the current frame belongs to. The PAAM depicts the transition in both shape and appearance (e.g., $A_1, A_2, A_P,$ and $S_1, S_2, S_P$) through a conditional Gaussian distribution. A database is used to learn the joint Gaussian distribution of the shapes and appearances belonging to two consecutive motion phases (i.e., a pair of motion phases), from which the conditional Gaussian distribution is analytically computed.

The shape of the Left Ventricle (LV) is represented by $M_s$ landmark points, or equivalently a $2M_s$-dimensional vector S.

The appearance A is represented by a $M_g$-dimensional vector. The shape and appearance vectors are concatenated at two consecutive motion phases to form paired data: $s_p = [S_p^T | S_{p-1}^T]^T$ and $a_p = [A_p^T | A_{p-1}^T]^T$, where $p \in \{1, 2, \ldots, P\}$ is the phase index. It is assumed that $S_o \doteq S_p$ and $A_o \doteq A_p$.

The AAM is learned for each pair of motion phases. The shape subspace is constructed based on $s_p$ using the principal component analysis (PCA). The subspace can be represented by:

$$s_p \approx \bar{s}_p + P_p^{<s>} b_p^{<s>} \tag{1}$$

where $P^{<s>}$ is a subspace matrix (eigenvectors) describing a sufficient fraction of the total shape variation, $b^{<s>}$ is a vector containing the combination coefficients for each of the eigenvectors. Similarly, the appearance subspace is constructed based on $a_p$ using PCA.

$$a_p \approx \bar{a}_p + P_p^{<a>} b_p^{<a>} \tag{2}$$

Next a third PCA is applied to the combination of shape and appearance:

$$b_p = \begin{bmatrix} b_p^{<s>} \\ W_p^{<a>} b_p^{<a>} \end{bmatrix} \approx Q_p c_p = \begin{bmatrix} Q_p^{<s>} \\ Q_p^{<a>} \end{bmatrix} c_p \tag{3}$$

where $W_p^{<a>}$ is a diagonal matrix that balances the energy discrepancy between the shape and appearance models, $Q_p$ is the eigenvector matrix, and $c_p$ is a latent vector that controls both the shape and appearance models.

The PAAM will now be described. The shape and appearance are denoted by $z=[S^T, A^T]^T$. For the $p^{th}$ pair of motion phases, its distribution $p(z_p, z_{p-1})=p(S_p, A_p, S_{p-1}, A_{p-1})$ is Gaussian, whose mean and covariance matrix are expressed as:

$$\mu_p = \begin{bmatrix} \mu_p^{<z>} \\ \mu_{p-1}^{<z>} \end{bmatrix}, \sum_p \begin{bmatrix} \sum_{p,p}^{<z>} & \sum_{p,p-1}^{<z>} \\ \sum_{p-1,p}^{<z>} & \sum_{p-1,p-1}^{<z>} \end{bmatrix}$$

It is easy to see that the conditional probability $p(z_p | z_{p-1})$ which is actually used in tracking, is also Gaussian with the mean and covariance matrix given as:

$$\mu_{p|p-1}^{<z>} = \mu_p^{<z>} + \sum_{p,p-1}^{<z>} \left[ \sum_{p-1,p-1}^{<z>} \right]^{-1} (z_{p-1} - \mu_{p-1}^{<z>}), \tag{4}$$

$$\sum_{p|p-1}^{<z>} = \sum_{p,p}^{<z>} - \sum_{p,p-1}^{<z>} \left[ \sum_{p-1,p-1}^{<z>} \right]^{-1} \sum_{p-1,p}^{<z>} \tag{5}$$

In practice, if the Gaussian assumption is not satisfactory, the data is grouped into several clusters and the PAAM for each cluster is learned to handle possible data nonlinearity.

In general, tracking algorithms can be broadly divided into two categories, depending on the way in which online observations and offline learned models are integrated. In the first category, the models are embedded into the so-called observation likelihood. The motion parameters are used to deform the observation to best fit the likelihood. An example is the AAM. In the second category, generic optical flow computation is first conducted for each landmark. Learned models are then applied to regularize the overall shape. An example is the fusion approach which can be used to practice the present invention. The fusion approach is comprised of two processes: observation and fusion. The observation process computes optical flow for individual landmarks and the fusion process regularizes the whole contour.

In the observation process, a nonparametric local appearance model (NLAM) is constructed on the fly to model the shape and appearance at a point level. The output of the observation process is the location and covariance matrix of the landmarks as well as the appearance and its uncertainty. At time t, the fusion process derives an optimal solution $z_1^*$ that minimizes the fusion cost $d_{t|t-1}^2 = d_{t/t-1,1}^2 + d_{t/t-1,2}^2$, where $$d_{t|t-1,i}^2 = (z_1 - z_{t|t-1,i})^T C_{t|t-1,i}^{-1} (z_1 - z_{t|t-1,i}); i=1, 2, \quad (6)$$

and $z_{t|t-1,i}$ and $C_{t|t-1,i}$ are the mean vector and covariance matrix, respectively. The first distance $d_{t/t-1,1}^2$, in (6) arises from the observation process that provides the mean vector $z_{t/t-1,1}$ and the covariance vector $$C_{t|t-1,1}.$$

The second distance $d_{t|t-1,2}^2$ in (6) is from the PAAM (see (4) and (5)). There are two possible situations from time t−1 to t: (a) there is no transition in the motion phase, i.e., staying at the same motion phase p; or (b) there is a transition in the motion phase from p−1 to p.

$$z_{t|t-1,2} = \mu_p^{<z>}, C_{t|t-1,2} = \sum_{p,p}^{<z>}; \text{if } (a), \quad (7)$$

$$z_{t|t-1,2} = \mu_{p|p-1}^{<z>}, C_{t|t-1,2} = \sum_{p|p-1}^{<z>}; \text{if } (b), \quad (8)$$

When evaluating the above $\mu_{p|p-1}^{<z>}$ exactly defined in (4), $z_{p-1} = z_{t-1}^*$ is used. To determine (a) or (b) in echocardiography is easy by using the cardiac period T, the ED frame $t_{ED}$, and the ES frame $t_{ES}$. All of this information is directly available from the video sequence file.

When there is a motion transition, using the conditional probability $p(z_p|z_{p-1})$ is beneficial because $z_{t|t-1,2}$ is always updated during the iterations and hence adaptive to the previous observation $z_{t-1}^*$. On the other hand, the covariance matrix $$\sum_{p|p-1}^{<z>}$$

is fixed and hence pre-computable during training, which improves computational efficiency.

Usually $$C_{t|t-1,2}$$

is singular due to the high dimensionality of the shape and appearance vectors, thereby leading to a non-orthogonal subspace projection problem. Suppose the rank of $$C_{t|t-1,2}$$

is q and its rank-q SVD is $$C_{t|t-1,2} = U_q \Lambda_q U_q^T,$$

the best fusion estimator that minimizes the fusion cost is the so-called best linear unbiased estimate:

$$z_t^* = U_q(U_q^T C_{t|t-1,1}^{-1} U_q + \Lambda_q^{-1})^{-1}(U_q^T C_{t|t-1,1}^{-1} z_{t|t-1,1} + \Lambda_q^{-1} U_q^T z_{t|t-1,2}) \quad (9)$$

In practice, because the data is clustered and several submodels are learned for each pair of motion phases, the submodel with the smallest fusion cost is selected.

An example of the present invention will now be described. A training database is used which comprises 400 apical four-chamber (A4C) video sequences and 320 apical two chamber (A2C) video sequences. In total, there are approximately 11000 A4C image frames and approximately 9200 A2C image frames. Five-fold cross validation is used for performance evaluation. The ground truth contours were generated by experts.

Before training of the database images is performed, the images are preprocessed. First video frames are sampled and classified to different phases. Global appearance patches are cropped out from each sampled frame and then rigidly aligned to a mean shape in a 50×40 template using a thin-plate splines warping algorithm. Next, since echocardiograms have highly non-Gaussian intensity histograms, a nonlinear ultrasound specific normalization method is applied to transform the non-Gaussian intensity histogram to have a normal distribution. However, this is only for appearance. The joint space of shape and appearance is hardly Gaussian even after this transformation. The shape contour comprises 17 control points resulting in the dimension of the shape vector being 34. The appearance patch contains 50×40=2000 pixels. Such a high dimension requires expensive computation. A preprocessing PCA is applied to reduce the dimensionality of the appearance from around 2000 pixels to 1000 pixels, before feeding them to train the PAAM. Using the preprocessed data, the PAAM is trained with P=9 components, each component comprising three sub-models.

Figure 4:
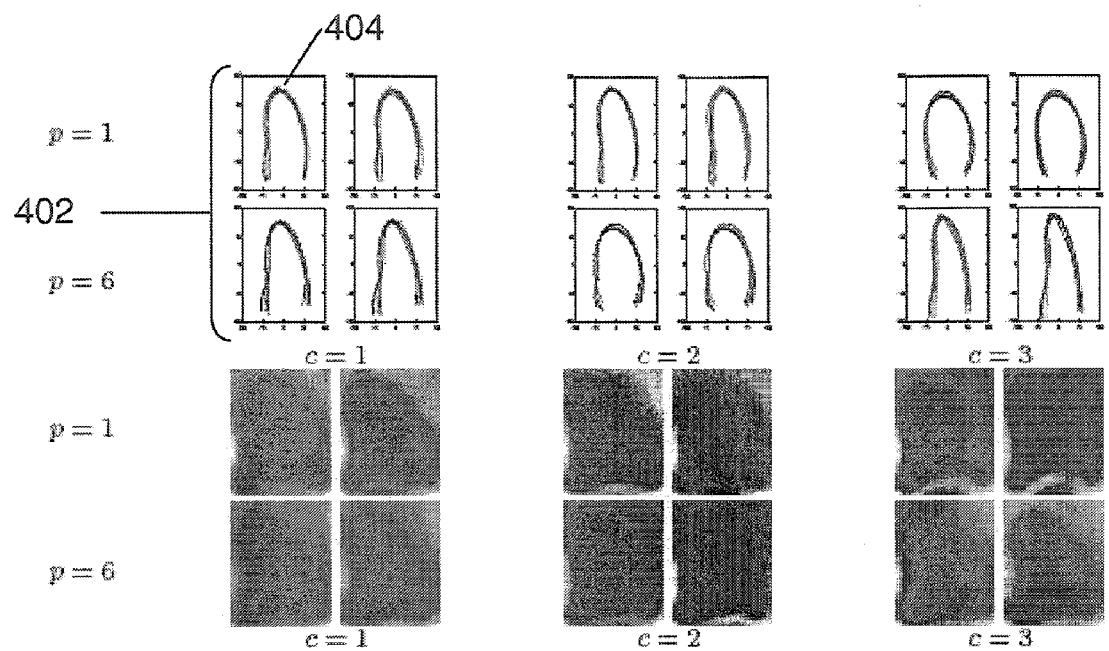
FIG. 4 illustrates example of shape and appearance subspaces of the trained PAAM in accordance with the present invention.

FIG. 4 illustrates the learned shape and appearance subspaces. In accordance with the example, three sub-models are trained for each pair of motion phases. As shown, c represents a cluster index and p represents a phase index. The rows in FIG. 4 correspond to clusters; columns correspond to phases. In the shape models 402, the solid lines such as contour 404 represent eigenvectors associated with the eigenvectors in the corresponding subspaces.

Figure 5:
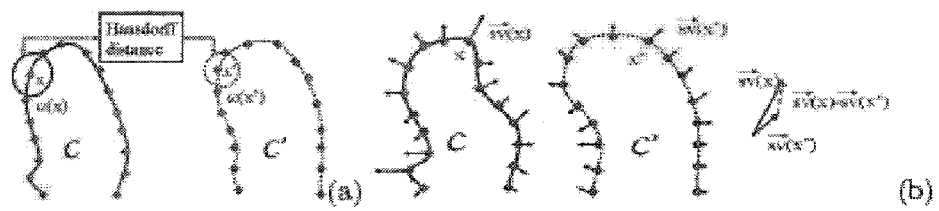
FIGS. 5a and 5b illustrate the segmental Hausdorff distance and the surprisal vector distance in accordance with the present invention.

To evaluate the tracking performance, the proximity between the two contours must be measured. In accordance with the present invention, a segmental Hausdorff distance (segHD) is used that allows a certain degree of non-rigidity. As illustrated in FIG. 5a, the segHD between two corresponding landmark points x and x' on the two curves C and C', respectively, is defined as the Hausdorff distance (HD) between two segments $\omega(x)$ and $\omega(x')$, where $\omega(x)$ defines a segment around x on the curve C. Next the mean of the segHD is computed for all of the landmark points as the distance between C and C', denoted by $d_{segHD}(C, C')$.

$$shd(x, x') = HD(\omega(x), \omega(x')); d_{segHD}(C, C') \quad (10)$$
$$= \left\{ \int_x shd(x, x')dC \right\} / \left\{ \int_x dC \right\}$$

The segHD measures only the physical distance between the two contours, ignoring their curvedness. Even when the two contours C' and C" have the same distance to the ground truth contour C in terms of $d_{segHD}$, C' and C" can be differently perceived because they present different curvedness. A surprisal vector $\vec{sv}$ to quantify how the curve is perceived. FIG. 5b illustrates the surprisal vector. The direction of $\vec{sv}$ is the same as the outward normal direction and the magnitude $|\vec{sv}|$ is a function of curvature. When at the highly-curved part of the contour, the $|\vec{sv}|$ is large; when at the flat part, it is small. Using the surprisal vector, a surprisal vector distance $d_{surp}(C, C')$ to characterize the proximity of two contours in their curvedness.

$$surp(x,x')=\|\vec{sv}(x)-\vec{sv}(x')\|^2; d_{surp}(C,C')=\left\{\int_x surp(x,x'm)dC\right\}/\left\{\int_x dc\right\} \quad (11)$$

Figure 6:
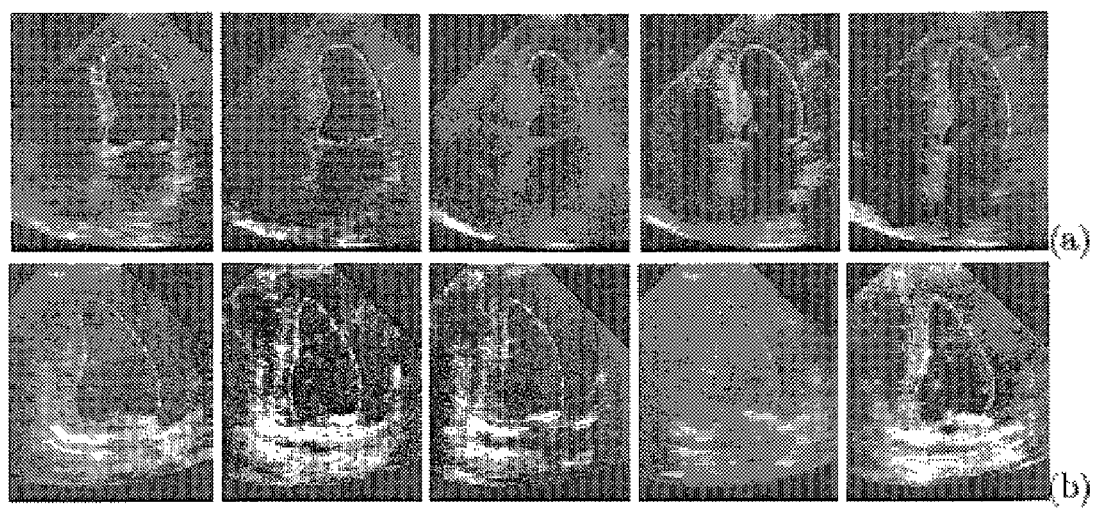
FIG. 6 illustrates tracking results of an A4C sequence and an A2C sequence in accordance with the present invention.

In accordance with the present invention, the PAAM is used to represent shape, appearance and motion information. The shape and appearance knowledge is described by the model subspaces, while the inter-phase motion is described by paired data. The model is integrated into a fusion algorithm for tracking. FIG. 6 illustrates tracking contours overlaid on sample frames of an A4C sequence and an A2C sequence.

Having described embodiments for a method for characterizing shape, appearance and motion of an object that is being tracked, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A method for generating Pairwise Active Appearance Models (PAAMs) that characterize shape, appearance and motion of an object comprising the steps of:
    a) receiving a plurality of video streams, each video stream comprising a series of image frames that depict an object in motion, each video stream including an index of identified motion phases that are associated with a motion cycle of the object;
    for each video stream:
    b) representing a shape of the object by a shape vector;
    c). representing an appearance of an object by an appearance vector;
    d) concatenating shape and appearance vectors associated at two consecutive motion phases;
    e). computing paired data for the concatenated shape and appearance vectors;
    f) repeating steps d) and e) to compute paired data for each two consecutive motion phases in the motion cycle;
    g) constructing a shape subspace based on the computed paired data;
    h). constructing an appearance subspace based on the computed paired data;
    i). constructing a joint subspace using a combination of the shape subspace and appearance subspace;
    j). generating a PAAM using the joint subspace; and
    k). storing the PAAM in a database.

2. The method of claim 1 wherein changes in shape and appearance between two consecutive motion phases are depicted as a conditional Gaussian distribution.

3. The method of claim 1 wherein the shape of the object is represented by a plurality of landmark points.

4. The method of claim 1 wherein the appearance of the object is represented by a multidimensional vector.

5. The method of claim 1 wherein the shape subspace is constructed using Principal Component analysis.

6. The method of claim 1 wherein the appearance subspace is constructed using Principal Component analysis.

7. The method of claim 1 wherein the joint subspace is constructed using Principal Component analysis.

8. The method of claim 1 wherein the object is a left ventricle.

9. The method of claim 8 wherein the PAAM characterizes the shape, appearance and motion of the endocardial wall.

10. The method of claim 9 wherein the motion cycle is the cardiac cycle.

11. A method for tracking an object in motion based on its shape and appearance at different motion phases, the object being represented by a plurality of landmark points, the method comprising the steps of:
    receiving a video stream comprising a series of image frames that depict an object in motion;
    identifying the shape of the object in a first image frame and initializing each landmark point associated with the shape of a contour of the object;
    computing an optical flow for each landmark point of the shape;
    determining a corresponding motion phase index for the first image frame;
    determining whether the motion phase in the second image frame is the same as the motion phase in the first image frame and which corresponding PAAM to use;
    and
    fusing the PAAM with the second image frame to predict the location of the landmark points associated with the object in the second image frame.

12. The method of claim 11 further comprising the step of:
    measuring proximity between the predicted landmarks points associated with the object in the second image frame and actual landmark points associated with the object in the second image frame.

13. The method of claim 12 wherein the step of measuring proximity further comprises the step of:
    computing a segmental Hausdorff distance (segHD) and a surprisal vector distance between a predicted landmark point and a corresponding actual point.

14. The method of claim 13 wherein the segHD determine physical distance between the predicted landmark point and the corresponding point.

15. The method of claim 13 wherein the surprisal vector characterizes proximity of the predicted contour and the actual contour in terms of curvedness.

16. The method of claim 11 wherein the object is a left ventricle.

17. The method of claim 11 wherein the PAAM characterizes the shape, appearance and motion of the endocardial wall.

18. The method of claim 11 wherein the motion phase is part of a cardiac cycle.

* * * * *